United States Patent

Reuter et al.

Patent Number: 5,143,986
Date of Patent: Sep. 1, 1992

[54] POLYMER MIXTURES OF AN AROMATIC POLYETHER KETONE AND A THERMOPLASTIC POLYMER

[75] Inventors: Knud Reuter, Krefeld; Günter Weymans, Leverkusen; Rolf Dhein, Krefeld; Erich Meier, Leverkusen, all of Fed. Rep. of Germany

[73] Assignee: Bayer Aktiengesellschaft, Leverkusen, Fed. Rep. of Germany

[21] Appl. No.: 422,837

[22] Filed: Oct. 17, 1989

[30] Foreign Application Priority Data

Oct. 24, 1988 [DE] Fed. Rep. of Germany ....... 3836183

[51] Int. Cl.$^5$ .................. G08B 11/00; G08B 61/04
[52] U.S. Cl. ...................... 525/437; 525/68; 525/151; 525/153; 525/132; 525/439; 525/471
[58] Field of Search ............. 525/427, 437, 439, 132, 525/68, 151, 152, 153, 471

[56] References Cited

U.S. PATENT DOCUMENTS

| | | | |
|---|---|---|---|
| 4,010,147 | 3/1977 | Rose | 260/79.3 |
| 4,435,350 | 3/1984 | Fukushima et al. | 264/280 |
| 4,661,581 | 4/1987 | Nozawa | 528/176 |
| 4,704,448 | 11/1987 | Brugel | 528/125 |
| 4,964,890 | 10/1990 | Reuter et al. | 55/158 |

FOREIGN PATENT DOCUMENTS

| | | |
|---|---|---|
| 0133907 | 3/1980 | European Pat. Off. |
| 0170067 | 5/1980 | European Pat. Off. |
| 1078234 | 8/1967 | United Kingdom |

OTHER PUBLICATIONS

Handbook of Chemistry and Physics, 50th Edition, edited by R. C. Weast Cleveland: The Chemical Rubber Company, (1969) C-194,500,70.

R. T. Morrison and R. N. Boyd, Organic Chemistry (Boston: A-lyn and Bacon Inc. 1959) pp. 513-514.

*Primary Examiner*—John C. Bleutge
*Assistant Examiner*—R. Dean, Jr.
*Attorney, Agent, or Firm*—Joseph C. Gil; Richard E. L. Henderson

[57] ABSTRACT

Mixtures containing aromatic polyether ketones based on diphenols corresponding to formula (I)

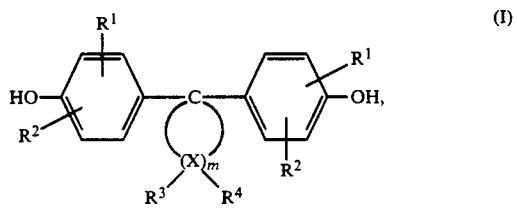

in which $R^1$ and $R^2$ independently of one another represent hydrogen, halogen, $C_{1-8}$ alkyl, $C_{5-6}$ cycloalkyl, $C_{6-10}$ aryl and $C_{7-12}$ aralkyl, m is an integer of from 4 to 7, $R^3$ and $R^4$ may be individually selected for each X and independently of one another represent hydrogen or $C_{1-5}$ alkyl and X represents carbon, with the proviso that, at at least one atom X, $R^3$ and $R^4$ are both alkyl, and other organic polymers and films of these polymer mixtures.

4 Claims, No Drawings

POLYMER MIXTURES OF AN AROMATIC POLYETHER KETONE AND A THERMOPLASTIC POLYMER

This invention relates to mixtures containing aromatic polyether ketones based on dihydroxydiphenyl cycloalkanes corresponding to formula (1)

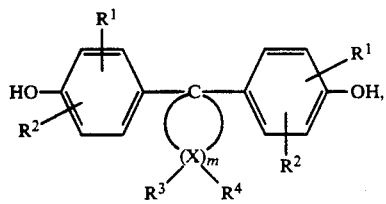

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more especially benzyl and cumyl, m is an integer of from 4 to 7, preferably 4 or 5, $R^3$ and $R^4$ may be individually selected for each X and independently of one another represent hydrogen or $C_{1-5}$ alkyl and alkyl and X represents carbon, with the proviso that, at at least one atom X, both $R^3$ and $R^4$ are alkyl, and other organic polymers and to 1 to 2000 μm thick films of these mixtures.

Diphenols corresponding to formula (I) are the subject of earlier patent application P 38 32 396.6 while the special aromatic polyether ketones are the subject of earlier patent application P 38 33 385.6.

Preferably at 1 to 2 atoms X and, more particularly, at only 1 atom X, both $R^3$ and $R^4$ in formula (I) are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Alkyl-disubstitution in the β-position and mono-alkyl-substitution in the other β-position, is particularly preferred.

Particularly preferred starting materials are dihydroxydiphenyl cycloalkanes containing 5 and 6 ring C atoms in the cycloaliphatic radical (m=4 or 5 in formula (I)), for example diphenols corresponding to the following formulae

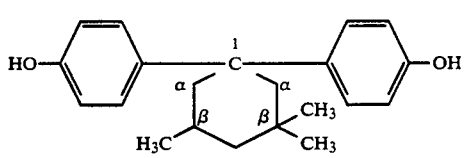

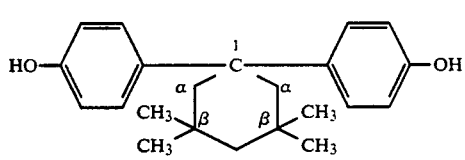

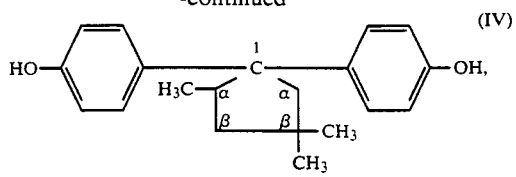

the 1,1-bis-(4-hydroxyphenyl)-3,3,5-trimethyl cyclohexane (formula II) being particularly preferred.

The dihydroxydiphenyl cycloalkanes corresponding to formula (I) may be obtained in known manner by condensation of phenols corresponding to formula (V)

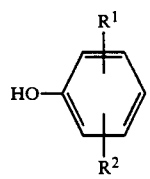

and ketones corresponding to formula (VI

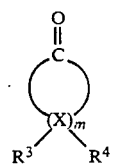

where X, $R^1$, $R^2$, $R^3$, $R^4$ and m are as defined for formula (I).

The phenols corresponding to formula (V) are either known from the literature or may be obtained by methods known from the literature (see for example Ullmanns Encylkopädie der technischen Chemie, 4th Edition, Vol. 15, pages 61–77).

Examples of suitable phenols corresponding to formula (V) are phenol, o-cresol, m-cresol, 2,6-dimethylphenol, 2-chlorophenol, 3-chlorophenol, 2,6-dichlorophenol, 2-cyclohexylphenol, o-phenylphenol and o- or p-benzylphenol.

The ketones corresponding to formula (VI) are known from the literature (cf. for example Beilsteins Handbuch der Organischen Chemie, 4th Edition, Vol. 7). A general process for the production of ketones corresponding to formula (VI) is described, for example in "Organikum", 15th Edition, 1977, VEB-Deutscher Verlag der Wissenschaften, Berlin, page 698.

The following are examples of ketones corresponding to formula (VI) 3,3-dimethylcyclopentanone, 2,2-dimethylcyclohexanone, 3,3-dimethylcyclohexanone, 4,4-dimethylcyclohexanone, 3-ethyl-3-methylcyclopentanone, 2,3,3-trimethylcyclopentanone, 2,4,4-trimethylcyclopentanone, 3,3,4-trimethylcyclopentanone, 3,3-dimethylcycloheptanone 4,4-dimethylcycloheptanone, 3-ethyl-3-methylcyclohexanone, 4-ethyl-4-methylcyclohexanone, 2,3,3-trimethylcyclohexanone, 2,4,4-trimethylcyclohexanone, 3,3,4-trimethylcyclohexanone, 2,5,5-trimethylcyclohexanone, 3,3,5-trimethylcyclohexanone 3,4,4-trimethylcyclohexanone, 2,3,3,4-tetramethylcyclopentanone, 2,3,4,4-tetramethylcyclopentanone, 3,3,4,4-tetramethylcyclopentanone, 2,2,5-trimethylcycloheptanone, 2,2,6-trimethylcycloheptanone, 2,6,6-trimethylcycloheptanone, 3,3,5-trimethylcycloheptanone, 3,5,5-trimethylcycloheptanone,5-ethyl-2,5-dimethylcycloheptanone, 2,3,3,5-tetramethylcycloheptanone, 2,3,5,5-tetramethylcycloheptanone, 3,3,5,5-tetramethylcycloheptanone, 4-ethyl-2,3,4-trimethylcyclopentanone, 2-isopropyl-4,4-dimethylcyclopentanone, 4-isopropyl-2,4-dimethylcyclopentanone, 2-ethyl-3,5,5-trimethylcyclohexanone, 3-ethyl-3,5,5-trimethylcyclohexanone, 3-ethyl-4-isopropyl-3-methylcyclopentanone, 4-sec.-butyl-3,3-dimethylcyclopentanone,2-isopropyl-3,3,4-trimethylcyclopentanone, 3-ethyl-4-isopropyl-3-methyl-cyclohexanone, 4-ethyl-3-isopropyl-4-methylcyclohexanone, 3-sec.-butyl-4,4-dimethylcyclohexanone, 3-isopropyl-3,5,5-trimethylcyclohexanone, 4-isopropyl-3,5,5trimethylcyclohexanone, 3,3,5-trimethyl-5-propylcyclohexanone, 3,5,5-trimethyl-5-propylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone, 5-ethyl-2,4-diisopropyl-5methylcyclohexanone, 2,2-dimethylcyclooctanone and 3,3,8-trimethylcyclooctanone.

The following are examples of preferred ketones:

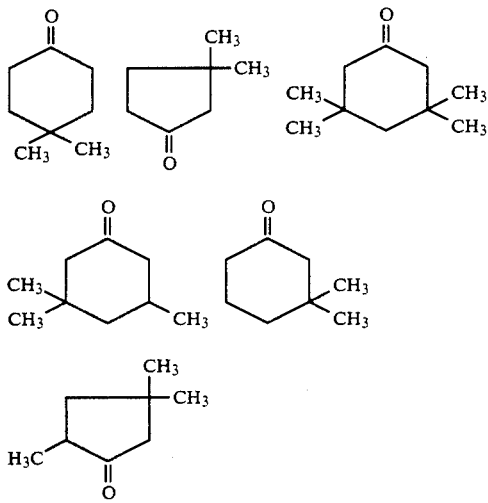

To prepare the bisphenols, the phenol (V) is generally used in a quantity of 2 to 10 mol and preferably in a quantity of 2.5 to 6 mol per mol ketone (VI). Preferred reaction times are from 1 to 100 hours. The reaction is generally carried out at a temperature in the range from $-30°$ C. to $300°$ C. and preferably at a temperature in the range from $-15°$ C. to $150°$ C. and under a pressure of from 1 to 20 bar and preferably under a pressure of from 1 to 10 bar.

The condensation is generally carried out in the presence of acidic catalysts such as, for example, hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric acid or sulfuric acid and also mixtures of acetic acid and acetanhydride. Acidic ion exchangers may also be used.

In addition, the reaction may be accelerated by addition of co-catalysts, such as $C_1-C_{18}$ alkyl mercaptans, hydrogen sulfide, thiophenols, thio acids and dialkyl sulfides.

The condensation may be carried out in the absence of solvents or in the presence of an inert solvent (for example an aliphatic or aromatic hydrocarbon, chlorinated hydrocarbon).

In cases where the catalyst also acts as a dehydrating agent, there is no need to use separate dehydrating agents, although, to obtain good conversions, it is always of advantage to use dehydrating agents when the catalyst used does not bind the water of reaction.

Suitable dehydrating agents are, for example, acetanhydride, zeolites, polyphosphoric acid and phosphorus pentoxide.

According to the invention, aromatic polyether ketones containing the following recurring structural unit are used:

in which —E'— is a two-bond group of an aromatic ketone corresponding to formula (VIIIa)

in which

Ar and Ar' may be the same or different and represent difunctional aromatic radicals containing from 6 to 50 carbon atoms
and in which

is a two-bond diphenolate residue, characterized in that from 0.1 mol-% to 100 mol-%, preferably from 3 mol-% to 100 mol-% and, more preferably, from 10 mol-% to 100 mol-% of the diphenolate residues (IXa) are those corresponding to formula (Ia)

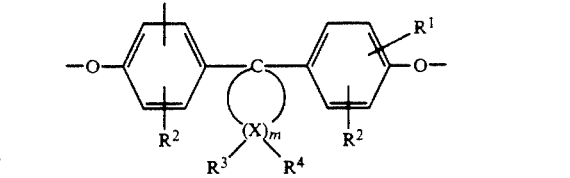

in which X, $R^1$, $R^2$, $R^3$, $R^4$ and m are as defined in formula (I).

The aromatic polyether ketones according to the invention preferably have average molecular weights $\overline{M}_w$ (weight average), as determined for example by gel permeation chromatography or light scattering, in the range from 742 to 500,000, preferably in the range from 3,000 to 200,000 and more preferably in the range from 5,000 to 100,000.

Aromatic polyether ketones are known (cf. for example GB-PS 1,078,234, U.S. Pat No. 4,010,147 and EP-A 0 135 938). They may be prepared, for example, by reaction of dialkali salts of diphenols with dihalodiaryl ketones in a polar solvent (cf. for example GB-PS 1,078,234); the dialkali salts of the diphenols may also be produced in situ.

The polyether ketones suitable for use in accordance with the invention may also be prepared by this method, the polar solvent used preferably being caprolactam $C_{1-5}$-alkyl-substituted at the nitrogen, such as N-methyl caprolactam, N-ethyl caprolactam, N-n-propyl caprolactam, N-isopropyl caprolactam, preferably N-methyl caprolactam, and pyrrolidones $C_{1-5}$-alkyl:-substituted at the nitrogen, such as N-ethyl pyrrolidone, N,N- dimethyl formamide, N,N-dimethyl acetamide, dimethyl sulfoxide, dimethyl sulfone, sulfolan and tetramethyl urea. Other less polar solvents, for example aromatic hydrocarbons, such as toluene, xylene, mesitylene, chlorobenzene, or aliphatic hydrocarbons, such as gasolines, cyclohexane, may be used in part, for example in quantities of 0.1 to 200% by weight, based on the weight of the polar solvent.

Accordingly, to prepare the polyether ketones containing the structural unit (VII) suitable for use in accordance with the invention, dialkali diphenolates (IXb)

Alkali—O—E—O—Alkali (IXb)

are reacted with dihalodiaryl ketones

(VIII)

in which Ar and Ar' may be the same or different and represent difunctional aromatic radicals containing from 6 to 50 carbon atoms and Hal represents halogen, such as fluorine, chlorine, bromine, preferably fluorine and chlorine, in solvents, from 0.1 mol-% to 100 mol-%, preferably 3 mol-% to 100 mol-% and, more preferably, from 10 mol-% to 100 mol-% of the dialkali diphenolates IXb corresponding to formula Ib

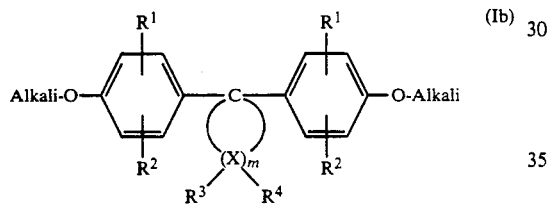
(Ib)

in which X, $R^1$, $R^2$, $R^3$, $R^4$ and m are as defined for formula (I), and polar solvents, such as N-alkylated caprolactams or N-alkylated pyrrolidones, preferably N-alkylated pyrrolidones, being used.

Suitable diphenols corresponding to formula (IX) are, for example, hydroquinone, resorcinol, dihydroxydiphenyls, bis-hydroxyphenyl)-alkanes, bis-(hydroxyphenyl)-cyclo-alkanes,bis-(hydroxyphenyl)-sulfides,bis-(hydroxyphenyl)ethers, bis-(hydroxyphenyl)-ketones, bis-(hydroxyphenyl)sulfones, bis-(hydroxyphenyl)-sulfoxides, o,o,-bis-(hydroxyphenyl)-diisopropylbenzenes and nucleus-alkylated and nucleus-halogenated compounds thereof.

These and other suitable other diphenols (IX) are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 0956, in FR-PS 1 561 518 and in the book by H. Schnell entitled "Chemistry and Physics of Polycarbonates", Interscience Publishers, New York, 1964.

Preferred other diphenols (IX) are, for example, 4,4,-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane,o,o,-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)-propane and 4,4,-dihydroxydiphenyl sulfone.

Particularly preferred other diphenols (IX) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 4,4,-dihydroxydiphenyl sulfone.

They may be used individually or in admixture.

Formulae IXa and IXb represent the residues of these diphenols formed by removal of 2H atoms and the alkali salts of this compound.

4,4'-dichlorobenzophenone,
4-chloro-4'-fluorobenzophenone,
4,4'-difluorobenzophenone, 4,4'-dichloroterephthalophenone =
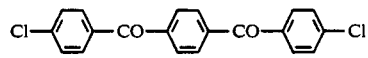

4,4'-difluoroterephthalophenone =
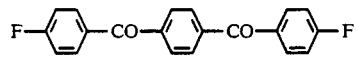

4,4'-dichloroisophthalophenone =
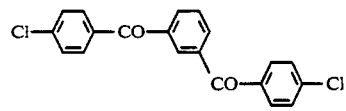

4,4'-difluoroisophthalophenone =
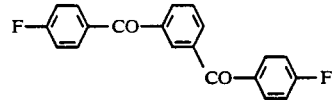

4,4'-bis-(p-chlorobenzoyl)-diphenyl ether =
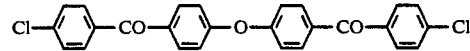

4,4'-bis-(p-fluorobenzoyl)-diphenyl ether =
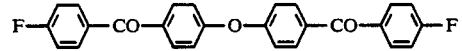

3,3'-dinitro-4,4'-dichlorobenzophenone,
3,3'-dinitro-4,4'-difluorobenzophenone,
4,4'-bis-(p-chlorobenzoyl)-biphenyl =
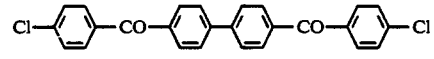

4,4'-bis-(p-fluorobenzoyl)-biphenyl =
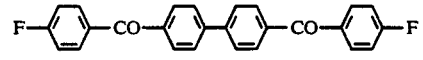

2,8-bis-(p-chlorobenzoyl)-diphenylene oxide =
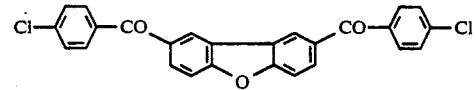

4,4'-bis-(p-halobenzoyl)-diphenyl methane derivatives corresponding to the formula

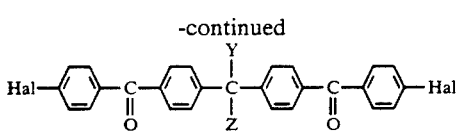

in which Y, Z may be the same or different and represent $C_1$-$C_9$ aliphatic, $C_{5-6}$ cycloaliphatic, $C_{6-10}$ aromatic or $C_{7-12}$ araliphatic radicals or hydrogen and Hal is fluorine or chlorine, for example

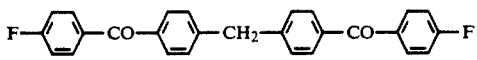

The preferred radical Ar and Ar' is formula (VIII) is thus the p-phenylene radical which may also be substituted, for example alkyl- or nitro-substituted p-phenylene radicals or radicals corresponding to the following formula

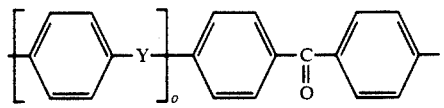

in which y = —O—, $CH_2$, —CO—, a single bond and o = 0 or 1 and Hal is fluorine or chlorine.

The alkali in the dialkali phenolates (Ib) and (IXb) is preferably sodium or potassium.

The halogen in the dihalodiaryl ketones (VIII) is fluorine, chlorine and bromine, preferably fluorine and chlorine.

Preferred polyether ketones suitable for use in accordance with the invention are those containing at least 10 mol-% of recurring structural units corresponding to the following formula

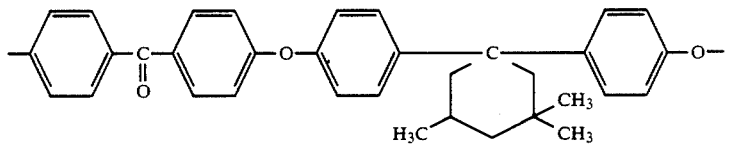

have a molecular weight above 3000 g/mol (weight average).

The aromatic polyether ketones may be prepared at temperatures in the range from 130° C. to 350° C. and preferably at temperatures in the range from 145° C. to 280° C. under pressures of from 0.8 to 10 bar and preferably under pressures of from 1 to 3 bar, more especially at atmospheric ambient pressure.

The molar quantitative ratio of the alkali diphenolates (Ib) and (IXb) to the dihalodiaryl ketones (VIII) is between 0.5 and 2, preferably between 0.8 and 1.2 and more preferably between 0.95 and 1.05, a ratio of 1 or very close to having to be selected for high molecular weights.

The quantity of polar solvents is from 0.5 to 50 parts by weight and preferably from 2 to 20 parts by weight, based on the total weight of the polyether ketone starting materials (I), (VIII) and (IX) = 1 part by weight.

The polyether ketones suitable for use in accordance with the invention may be recovered, for example, as follows from the reaction mixtures obtained The reaction mixture is diluted, particularly where highly viscous solutions are present, with the polar reaction solvent for example or with another solvent for the polyether ketone and filtered. After neutralization of the filtrate with a suitable acid, for example acetic acid, the polyether ketone is precipitated by pouring into a suitable precipitation medium, for example water or alcohols, such as for example methanol or isopropanol, or water/alcohol mixtures, for example $H_2O$/methanol 1:1, isolated and then dried.

The polyether ketones suitable for use in accordance with the invention are thermoplastic plastics of high heat resistance.

They may be processed, for example, by extrusion, injection molding, sintering or press molding.

The present invention relates to mixtures, containing
(a) aromatic polyether ketones based on dihydroxydiphenyl cycloalkanes corresponding to formula (I)

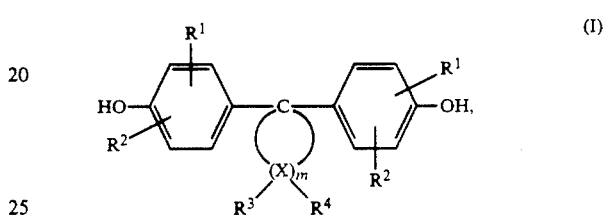

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more especially benzyl and cumyl, m is an integer of from 4 to 7, preferably 4 or 5, $R^3$ and $R^4$ may be individually selected from each X and independently of one another represent hydrogen or $C_{1-6}$ alkyl and X represents carbon, with the proviso that, at at least one atom X, both $R^3$ and $R^4$ are alkyl, and (b) other organic polymers.

The mixtures generally contain from 0.1 to 99.9% by weight of the aromatic polyether ketone (a), preferably from 1 to 98% by weight and more preferably from 2.5 to 90% by weight and, accordingly, from 99.9 to 0.1% by weight of the other organic polymers, preferably from 99 to 2% by weight and more preferably from 97.5 to 10% by weight.

In addition, the mixtures may contain typical additives, such as stabilizers, fillers, dyes.

The mixtures may be prepared by the methods normally used for mixing plastics, for example by compounding in the melt, by mixing of powders, by coextrusion, by mixing of solutions and evaporation, by mixing of latices (or other dispersions) and co-precipitation. The method selected in each individual case will be determined by the type and aggregate state of the mixture component.

Other organic polymers (b) in the context of the invention are, for example, b1) amorphous thermoplastics, preferably those having a glass temperature of more than 40° C. and more especially in the range from 60° C. to 220° C., and also b2) partially crystalline thermoplastics, preferably those having a melting temperature of more than 60° C. and more especially in the range from 80° C. to 400° C.

Elastomers for components b) of the mixtures according to the invention are b3) polymers which have a glass temperature below 0° C., preferably below −10° C. and more especially in the range from −15° C. to −140° C.

Examples of amorphous thermoplastics b1) are amorphous polymers from the class of polycarbonates, polyamides, polyolefins, polysulfones, polyketones, thermoplastic vinyl polymers, such as polymethyl acrylates, or homopolymers of aromatic vinyl compounds, copolymers of aromatic vinyl compounds or graft polymers of vinyl monomers on rubbers, polyethers, polyimides and thermoplastic polyurethanes, aromatic polyester (carbonates) based on bisphenol A and liquid crystalline polymers.

Examples of crystalline thermoplastics b2) are aliphatic polyesters, polyarylene sulfides and the partially crystalline representatives of the thermoplastics listed above under b1).

Examples of elastomers b3) are the various rubbers, such as ethylene-propylene rubber, polyisoprene, polychloroprene, polysiloxanes, atactic polypropylene, diene, olefin and acrylate rubbers and natural rubbers, styrenebutadiene block copolymers, copolymers of ethylene with vinyl acetate or with (meth)acrylates, elastic polyurethanes, unless listed as thermoplastics under b1) or b2), and elastic polycarbonate-polyether block copolymers.

Amorphous thermoplastics b1) are, in particular, known polycarbonates, including those according to German patent application P 38 32 396.6. Polycarbonates may be both homopolycarbonates and also copolycarbonates and may be both linear and branched. The particularly preferred bisphenol for the thermoplastic polycarbonates (b) is bisphenol A [=2,2-bis-(4-hydroxyphenyl)-propane].

Thermoplastic polycarbonates are known.

The molecular weights $\overline{M}w$ (weight average molecular weight, as determined by gel permeation chromatography in tetrahydrofuran) of the thermoplastic polycarbonates are in the range from 10,000 to 300,000 and preferably in the range from 12,000 to 150,000.

The thermoplastic polycarbonates may be used both individually and in admixture as component (b) of the mixtures according to the invention.

Particular preference is attributed to mixtures of the aromatic polyether ketones based on the diphenols (I) and aromatic polycarbonates based on bisphenol A (and optionally up to 10% by weight of another bisphenol) having molecular weights in the range from 8,000 to 150,000 g/mol, preferably in the range from 10,000 to 120,000 g/mol and more preferably in the range from 15,000 to 80,000 g/mol. The mixtures generally contain from 99.5 to 50% by weight polycarbonate and from 0.1 to 50% by weight aromatic polyether sulfone. It is important that, in all the bisphenolate residues present in the mixture, from 1 to 30 mol-% are bisphenol A residues and from 99 to 70 mol-% residues of the bisphenol corresponding to formula (I) or from 99 to 70 mol-% are bisphenol A residues and from 1 to 30 mol-% residues of the bisphenol corresponding to formula (I).

These mixtures are heat-resistant and transparent and hence are suitable for optical applications.

Preferred other thermoplastics (b) for the production of the mixtures according to the invention are also aliphatic, thermoplastic polyesters, more preferably polyalkylene terephthalates, i.e. for example those based on ethylene glycol, propane-1,3-diol, butane-1,4-diol, hexane-1,6-diol and 1,4-bis-hydroxymethyl cyclohexane.

The molecular weights ($\overline{M}w$) of these polyalkylene terephthalates are in the range from 10,000 to 80,000. The polyalkylene terephthalates may be obtained by known methods, for example from terephthalic acid dialkyl ester and the corresponding diol by transesterification (cf. for example U.S. Pat. No. 2,647,885, 2,643,989, 2,534,028, 2,578,660, 2,742,494, 2,901,466).

These polyesters are known. Preferred other thermoplastics also include thermoplastic polyamides.

Suitable thermoplastic polyamides are any partially crystalline polyamides, particularly polyamide-6, polyamide-6,6, and partially crystalline copolyamides based on these two components. Other suitable thermoplastic polyamides are partially crystalline polyamides of which the acid component consists completely or in part of, in particular, adipic acid or caprolactam of terephthalic acid and/or isophthalic acid and/or suberic acid and/or sebacic acid and/or azelaic acid and/or dodecane dicarboxylic acid and/or adipic acid and/or a cyclohexane dicarboxylic acid, and of which the diamine component consists completely or in part of, in particular, m- and/or p-xylylenediamine and/or hexamethylenediamine and/or 2,2,4- and/or 2,4,4-trimethyl hexamethylenediamine and/or isophoronediamine and of which the compositions are known in principle from the prior art (cf. for example Encyclopedia of Polymers, Vol. 11, pages 315 et seq.).

Other suitable thermoplastic polyamides are partially crystalline polyamides produced completely or in part from lactams containing 6 to 12 carbon atoms, optionally using one or more of the starting components mentioned above.

Particularly preferred partially crystalline polyamides are polyamide-6 and polyamide-6,6 or copolyamides containing a small amount (up to about 10% by weight) of other co-components.

Suitable polyamides are also amorphous polyamides obtained, for example, by polycondensation of diamines, such as for example hexamethylenediam;ines, decamethylenediamine, 2,2,4- and 2,4,4-trimethyl hexamethylenediamine, m- or p-xylylenediamine, bis-(4-aminocyclohexyl)-methane, mixtures of 4,4,- and 2,2,- diaminodicyclohexyl methanes, 2,2-bis-(4-aminocyclohexyl)-propane, 3,3,-dimethyl-4,4,-diaminodicyclohexyl methane, 3-aminoethyl-3,5,5-trimethyl cyclohexyl amine, 2,5-bis-(aminomethyl)-norbornane, 2,6-bis-(aminomethyl)-norbornane, 1,4-diaminomethyl cyclohexane, and of mixtures of these diamines, with dicarboxylic acids, such as for example oxalic acid, adipic acid, azelaic acid, decane dicarboxylic acid, heptadecane dicarboxylic acid, 2,2,4-trimethyl adipic acid, 2,4,4-trimethyl adipic acid, isophthalic acid and terephthalic acid, and with mixtures of these dicarboxylic.acids. Accordingly, amorphous copolyamides obtained by polycondensation of several of the diamines and/or dicarboxylic acids mentioned above are also included. Amorphous copolyamides prepared using ω-aminocarboxylic acids, such as w-aminocaproic acid, ω-aminoundecanoic acid or ω-aminolauric acid, or lactams thereof, are also included.

Particularly suitable amorphous, thermoplastic polyamides are those obtainable from isophthalic acid, hexamethylenediamine and other diamines, such as 4,4'-diaminodicyclohexyl methane, isophoronediamine, 2,2,4- and 2,4,4-trimethyl hexamethylenediamine, 2,5- and/or 2,6-bis-(aminomethyl)-norbornane; those obtainable from isophthalic acid, 4,4'-diaminodicyclohexyl methane and ω-caprolactam; those obtainable from isophthalic acid, 3,3-dimethyl-4,4,-diaminodicyclohexyl methane and ω-lauric lactam; and those obtainable from terephthalic acid and the isomer mixture of 2,2,4- and 2,4,4-trimethyl hexamethylenediamine.

Instead of using pure 4,4,-diaminodicyclohexyl methane, it is also possible to use mixtures of the positionisomeric diaminodicyclohexyl methanes which consist of 70 to 99 mol-% of the 4,4,-diamino isomer, 1 to 30 mol-% of the 2,4,-diamino isomer, 0 to 2 mol-% of the 2,2,-diamino isomer and, optionally, correspondingly more highly condensed diamines obtained by hydrogenation of diaminodiphenyl methane of technical quality.

Suitable thermoplastic polyamides may also consist of mixtures of partially crystalline and amorphous polyamides, the amorphous polyamide component being smaller than the partially crystalline polyamide component. The amorphous polyamides and their production are also known from the prior art (cf. for example Ullmann, Enzyklopädie der technischen Chemie, Vol. 19, page 50).

Preferred other thermoplastics b) also include thermoplastic, linear or branched polyarylene sulfides. They have structural units corresponding to the following general formula

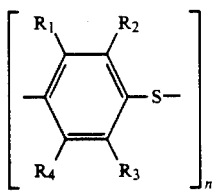

in which $R_1$ to $R_2$ may be independent or the same and represent $C_1-C_6$ alkyl, phenyl or hydrogen. The polyarylene sulfides may also contain diphenyl units.

Polyarylene sulfides and their production are known (see for example U.S. Pat. No. 3,354,129 and EP-OS 0 171 021).

Suitable other thermoplastics (b) are also thermoplastic polyarylene sulfones which have not been produced on the basis of diphenols corresponding to formula (I) Suitable polyarylene sulfones have average weight average molecular weights $\overline{M}w$ (as measured by the scattered light method in CHCl$_3$) in the range from 1,000 to 200,000 and preferably in the range from 20,000 to 60,000.

Examples are the polyarylene sulfones obtainable in known manner from 4,4'-dichlorodiphenyl sulfone and a bisphenol, particularly 2,2-bis-(4-hydroxyphenyl)-propane, which have average weight average molecular weights $\overline{M}w$ of from 2,000 to 200,000.

These polyarylene sulfones are known (cf. for example U.S. Pat. No. 3,264,536, DE-AS 1 794 171, GB-PS 1,264,900, U.S. Pat. No. 3,641,207, EP-A-0 038 028, DE-OS 3 601 419 and DE-OS 3 601 420). The suitable polyarylene sulfones may also be branched in known manner (cf. for example DE-OS 2 305 413).

Preferred other thermoplastics b) also include thermoplastic polyphenylene oxides, preferably poly-(2,6-dialkyl-1,4-phenylene oxides). Polyphenylene oxides suitable for the purposes of the invention have weight average molecular weights $\overline{M}w$ (as measured by the scattered light method in chloroform) of from 2,000 to 100,000 and preferably from 20,000 to 60,000. These polyphenylene oxides are known.

The preferred poly-(2,6-dialkyl-1,4-phenylene oxides) may be obtained in known manner by oxidizing condensation of 2,6-dialkylphenols with oxygen in the presence of catalyst combinations of copper salts and tertiary amines (see for example DE-OS 21 26 434 and U.S. Pat. No. 3,306,875).

Suitable poly-(2,6-dialkyl-1,4-phenylene oxides) are, in particular, the poly-[2,6-di-($C_1-C_4$-alkyl)-1,4-phenylene oxides], such as for example poly-(2,6-dimethyl-I,4-phenylene oxide).

Preferred other thermoplastics b) also include aro5 matic polyether ketones (cf. for example GB-PS 1,078,234, U.S. Pat. No. 4,010,147 and EP-OS 0 135 938).

They contain the recurring structural element

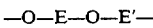

which —E'— is the residue of a bisaryl ketone having two bonds and —O—E—O— is a diphenolate residue having two bonds.

They may be obtained, for example, in accordance with GB-PS 1,078,234 from dialkali diphenolates having the formula Alkali—O—E—O—Alkali and bis-(haloaryl)-ketones having the formula Hal-E,-Hal (Hal=halogen). One suitable dialkali diphenolate is, for example, that of 2,2-bis-(4-hydroxyphenyl)-propane, while a suitable bis-(haloaryl)ketone is 4,4,-dichlorobenzophenone.

Preferred other thermoplastics b) also include thermoplastic vinyl polymers

Vinyl polymers in the context of the invention are homopolymers of vinyl compounds, copolymers of vinyl compounds and graft polymers of vinyl compounds on rubbers.

Homopolymers and copolymers suitable for the purposes of the invention are those of styrene, o-methyl styrene, acrylonitrile, methacrylonitrile, $C_1-C_{12}$ (cyclo)alkyl esters of (meth)acrylio acid, $C_1-C_4$ carboxylic acid vinyl esters, the copolymers also being obtainable from mixtures of these vinyl compounds by known methods.

The homopolymers or copolymers should have intrinsic viscosities of from 0.3 to 1.5 dl/g (as measured at 23° C. in toluene in known manner).

Suitable vinyl polymers are, for example, thermoplastic poly-$C_1-C_4$-alkyl methacrylates, for example those of methyl, ethyl, propyl or butyl methacrylate, preferably methyl or ethyl methacrylate. Both homopolymers and copolymers of these methacrylates are included. In addition, other ethylenically unsaturated, copolymerizable monomers, such as for example (meth)acrylonitrile, (o-methyl) styrene, bromostyrene, vinyl acetate, $C_1-C_8$ alkyl acrylate, (meth)acrylic acid, ethylene, propylene and N-vinyl pyrrolidone, may be copolymerized in small quantities.

The thermoplastic poly-$C_1-C_4$-alkyl methacrylates suitable for the purposes of the invention are known from the literature or may be obtained by methods known from the literature.

Suitable vinyl polymers also include copolymers of styrene or α-methyl styrene and acrylonitrile optionally containing up to 40% by weight of esters of acrylic or methacrylic, acid, particularly methyl methacrylate or nbutyl acrylate. Styrene derivatives must always be present as monomers. The styrene derivatives are present in proportions of 100 to 10% by weight, preferably 90 to 20% by weight and more preferably 80 to 30% by weight and may be obtained by standard methods, such as radical polymerization in bulk, solution, suspension or emulsion, but preferably by radical emulsion polymerization in water.

Suitable graft polymers are formed by polymerization of the above-mentioned vinyl monomers or mixtures of vinyl monomers in the presence of rubbers having glass temperatures below 0° C. and preferably below −20° C. The graft polymers generally contain 1 to 85% by weight and preferably 10 to 80% by weight rubber. The graft polymers may be prepared by standard methods in solution, bulk or emulsion, preferably in emulsion; mixtures of vinyl monomers may be simultaneously or successively graft-polymerized.

Suitable rubbers are, preferably, diene rubbers and acrylate rubbers.

Diene rubbers are, for example, polybutadiene, polyisoprene and copolymers of butadiene with up to 35% by weight comonomers, such as styrene, acrylonitrile, methyl methacrylate and $C_1$-$C_6$ alkyl acrylates.

Acrylate rubbers are, for example, crosslinked, particulate emulsion polymers of $C_1$-$C_6$ alkyl acrylates, particularly $C_2$-$C_6$ alkyl acrylates, optionally in admixture with up to 15% by weight of other unsaturated monomers, such as styrene, methyl methacrylate, butadiene, vinyl methyl ether, acrylonitrile, and of at least one polyfunctional crosslinking agent, such as for example divinylbenzene, glycol-bis-acrylates, bis-acrylamides, phosphoric acid triallyl ester, citric acid triallyl ester, allyl esters of acrylic acid and methacrylic acid, triallyl isocyanurate, the acrylate rubbers containing up to 4% by weight of the crosslinking comonomers.

Mixtures, of diene rubbers with acrylate rubbers and also rubbers having a core-shell structure are also suitable for the production of the graft polymers For graft polymerization, the rubbers must be present in the form of discrete particles, for example in the form of a latex. These particles generally have mean diameters of from 10 nm to 2000 nm.

The graft polymers may be produced by known methods, for example by radical emulsion graft polymerization of the vinyl monomers in the presence of rubber latices at temperatures of from 50° to 90° C. using water-soluble initiators, such as peroxodisulfate, or redox initiators.

Emulsion graft polymers produced by radical graft polymerization onto particulate, highly crosslinked rubbers (diene or alkyl acrylate rubbers) having gel contents of more than 80% by weight and mean particle diameters ($d_{50}$) of from 80 to 800 nm are preferred.

Technical ABS polymers are particularly suitable.

Mixtures of vinyl homopolymers and/or vinyl copolymers with graft polymers are also suitable.

Preferred other thermoplastics b) also include thermoplastic polyurethanes. These are reaction products of diisocyanates, completely or predominantly aliphatic oligoand/or polyesters and/or ethers and one or more chainextending agents. These thermoplastic polyurethanes are substantially linear and have thermoplastic processing characteristics.

The thermoplastic polyurethanes are known or may be obtained by known methods (cf. for example U.S. Pat. No. 3,214,411; J. H. Saunders and K. C. Frisch, "Polyurethanes, Chemistry and Technology", Vol. II, pages 299 to 451, Interscience Publishers, New York, 1964; and Mobay Chemical Corporation "A Processing Handbook for Texin Urethane Elastoplastic Materials", Pittsburgh, Penna.).

Starting materials for the production of the oligoesters and polyesters are, for example, adipic acid, succinic acid, sebacic acid, suberic acid, oxalic acid, methyl adipic acid, glutaric acid, pimelic acid, azelaic acid, phthalic acid, terephthalic acid and isophthalic acid.

Adipic acid is preferred.

Suitable glycols for the production of the oligoesters and polyesters are, for example, ethylene glycol, 1,2- and 1,3-propylene glycol, butane-1,2-, -1,3-, -1,4-, -2,3- and -2,4-diol, hexanediol, bis-hydroxymethyl cyclohexane, diethylene glycol and 2,2-dimethyl propylene glycol. In addition, small quantities, i.e. up to 1 mol-%, of trihydric or higher alcohols, for example trimethylol propane, glycerol, hexanetriol etc., may be used together with the glycols.

The resulting hydroxyl oligoesters or polyesters have a molecular weight of at least 600, a hydroxyl value of from about 25 to 190 and preferably from about 40 to 150, an acid value of from about 0.5 to 2 and a water content of from about 0.01 to 0.2%.

Oligoesters and polyesters also include oligomeric or polymeric lactones, such as for example oligocaprolactone or polycaprolactone, and aliphatic polycarbonates, such as for example polybutane-1,4-diol carbonate or polyhexane-1,6-diol carbonate.

A particularly suitable oligoester which may be used as starting material for the thermoplastic polyurethanes is prepared from adipic acid and a glycol containing at least one primary hydroxyl group. The condensation is terminated when an acid value of 10 and preferably of about 0.5 to 2 is reached. The water formed during the reaction is thus separated off simultaneously or afterwards, so that the final water content is between about 0.01 and 0.05% and preferably between 0.01 and 0.02.

Oligoethers and polyethers for the production of the thermoplastic polyurethanes are, for example, those based on tetramethylene glycol, propylene glycol and ethylene glycol.

Polyacetals may also be regarded as polyethers and may be used as such.

The oligoethers or polyethers should have average molecular weights $\overline{M}n$ (number average determined via the OH value of the products) of from 600 to 2,000 and preferably from 1,000 to 2,000.

4,4'-Diphenyl methane diisocyanate is preferably used as the organic diisocyanate for the production of the polyurethanes. It should contain less than 5% 2,4,-diphenyl methane diisocyanate and less than 2% of the dimer of diphenyl methane diisocyanate. In addition, the acidity, expressed as HCl, should be in the range from about 0.005 to 0.2%. The acidity expressed as % HCl is determined by extraction of the chloride from the isocyanate in hot, aqueous methanol solution or by liberation of the chloride during hydrolysis with water and titration of the extract with standard silver nitrate solution in order to obtain the concentration of chloride ions present therein.

It is also possible to use other diisocyanates for the production of the thermoplastic polyurethanes, including for example the diisocyanates of ethylene, ethylidene, propylene, butylene, cyclo-1,3-pentylene, cyclo-1,4-hexylene, cyclo-1,2-hexylene, 2,4-tolylene, 2,6-tolylene, p-phenylene, n-phenylene, xylene, 1,4-naphthylene, 1,5-naphthylene, 4,4'-diphenylene; 2,2-diphenylpropane-4,4'-diisocyanate, azobenzene-4,4'-diisocyanate, diphenylsulfone-4,4'-diisocyanate, dichlorohexamethylene diisocyanate, pentamethylene diisocyanate, hexamethylene diisocyanate, 1-chlorobenzene-2,4-diisocyanate, furfuryl diisocyanate, dicyclohexyl methane diisocyanate, isophorone diisocyanate, diphenyl ethane diisocyanate and bis-(isocyanatophenyl)-ethers of ethylene glycol, butanediol, etc.

Suitable chain-extending agents are organic difunctional compounds containing active, hydrogen reactive to isocyanates, for example diols, hydroxycarboxylic acids, dicarboxylic acids, diamines and alkanolamines and water. Examples of such chain-extending agents are, for example, ethylene, propylene and butylene glycol, butane-1,4-diol, butanediol, butynediol, xylylene glycol, amylene glycol, 1,4-phenylene-bis-$\beta$-hydroxyethyl ether, 1,3-phenylene-bis-$\beta$-hydroxyethyl ether, bis-(hydroxymethylcyclohexane), hexanediol, adipic acid, $\omega$-hydroxycaproic acid, thiodiglycol, ethylenediamine, propylene, butylene, hexamethylene, cyclohexylene, phenylene, tolylene and xylylenediamine, diaminodicyclohexyl methane, isophoronediamine, 3,3'-dichlorobenzidine, 3,3'-dinitrobenzidine, ethanolamine, aminopropyl alcohol, 2,2-dimethyl propanolamine, 3-aminocyclohexyl alcohol and p-aminobenzyl alcohol. The molar ratio of oligoester or polyester to bifunctional chain extender is in the range from 1:1 to 1:50 and preferably in the range from 1:2 to 1:30.

In addition to difunctional chain-extending agents, it is also possible to use trifunctional or more than trifunctional chain-extending agents in small quantities of up to about 5 mol-%, based on mols of difunctional chain-extending agents used.

Examples of trifunctional or more than trifunctional chain-extending agents are glycerol, trimethylol propane, hexanetriol, pentaerythritol and triethanolamine.

Monofunctional components, for example butanol, may also be used for the production of the thermoplastic polyurethanes.

The diisocyanates, oligoesters, polyesters, polyethers, chain-extending agents and monofunctional components mentioned as structural units for the thermoplastic polyurethanes are either known from the literature or may be obtained by methods known from the literature.

The known production of the polyurethanes may be carried out, for example, as follows:.

For example, the oligoesters or polyesters, the organic diisocyanates and the chain-extending agents may be individually heated, preferably to a temperature of from about 50° to 220° C., and then mixed. The oligoesters or polyesters are preferably first individually heated, then mixed with the chain-extending agents and the resulting mixture mixed with the preheated isocyanate.

The starting components for the production of the polyurethanes may be mixed by any mechanical stirrer which provides for intensive mixing in a short time. If the viscosity of the mixture should prematurely rise too quickly during stirring, either the temperature may be lowered or a small quantity (0.001 to 0.05% by weight, based on ester) citric acid or the like may be added to reduce the reaction velocity. To increase the reaction velocity, suitable catalysts, such as for example the tertiary amines mentioned in U.S. Pat. No. 2,729,618, may be used.

Preferred other thermoplastics are also so-called "LC" polymers. LC polymers are polymers capable of forming liquid crystalline melts. Polymers of this type, which are also termed "thermotropic", are sufficiently well-known (see for example EP-PS 0 131 846, EP-OS 0 132 637 and EP-OS 0 134 959). More literature is cited in these literature references which also describe determination of the liquid crystalline state of polymer melts.

Examples of LC polymers are aromatic polyesters based on optionally substituted p-hydroxybenzoic acid, optionally substituted iso- and/or terephthalic acids, 2,7-dihydroxynaphthalene and other diphenols (EP-OS 0 131 846), aromatic polyesters based on optionally substituted p-hydroxybenzoic acid, diphenols, carbonic acid and, optionally, aromatic dicarboxylic acids (EP-OS 0 132 637) and aromatic polyesters based on optionally substituted p-hydroxybenzoic acid, 3-chloro-4-hydroxybenzoic acid, isophthalic acid, hydroquinone and 3,4'- and/or 4,4'-dihydroxy,diphenyl, 3,4'and/or 4,4'-dihydroxydiphenyl ether and/or 3,4'- and/or 4,4'-dihydroxydiphenyl sulfide (EP-OS 0 134 959).

The LC polymers have a persistence length at room temperature of from 18 to 1300 Å, preferably from 25 to 300 Å and more preferably from 25 to 150 Å.

The persistence length of a polymer at room temperature characterizes the average entanglement of a molecular chain in a dilute solution under theta conditions (cf. for example P. J. Flory, Principles of Polymer Chemistry, Cornell Univ. Press, Ithaca, N.Y.) and half Kuhn's step length. The persistence length may be determined by various methods in dilute solutions, for example by light scattering and X-ray small angle measurements. After suitable preparation, the persistence length may also be determined by neutron small angle scattering in the solid. Other theoretical and experimental methods are described, for example, in J. H. Wendorff in "Liquid Crystalline Order in Polymers", Ed. A. Blumstein, Academic Press 1978, pages 16 et seq, and in the references cited in S. M. Aharoni, Macromolecules 19, (1986), pages 429 et sec.

Preferred elastomers b3) for component b) for the production of the mixtures according to the invention are the polyurethanes mentioned above, providing they are elastic, styrene-butadiene block copolymers which may be partially hydrogenated (for example Kraton G ®, a Shell product), the rubbers mentioned above for the graft polymers, the graft polymers themselves, providing they are elastic, and elastic polycarbonate-polyether block copolymers.

These elastomers are known.

The polymer mixtures according to the invention may be used as thermoplastic molding compounds. They are preferably used for the production of films by generally known methods.

The production of the films is described briefly in the following:

The films according to the invention have thicknesses in the range from 1 to 3000 $\mu$m and preferably in the range from 1.2 to 1500 $\mu$m. They may be monoaxially or biaxially stretched and/or oriented, preferably in a ratio of 1:1.5 to 1:5.0. These films are particularly suitable as heatresistant films.

Films may be prepared from the polymer mixtures according to the invention by extrusion, thermoforming or by casting of solutions in typical solvents (methylene chloride, dimethyl formamide, N-methyl pyrrolidone, tetrahydrofuran, dioxane, dioxolane). Films produced by extrusion (generally at 80° to 450° C.) are often biaxially stretched after cooling by at least 50° C. (but not below room temperature). Films suitable for thermoforming may be obtained by rolling out blocks of the polymer mixtures at temperatures of up to 350° C.

Cast films are obtained by pouring out concentrated solutions of the polymer mixtures onto flat surfaces and evaporating the solvent at 30° to 270° C. The flat surface may also be the surface of a liquid which has a higher density than the polymer solution and which does not dissolve either the polymers or their solvent.

The films according to the invention may be used on their own or in combination with films of other polymers.

EXAMPLES

1. Preparation of a Bisphenol Corresponding to Formula (A)

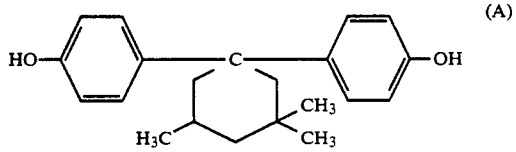

7.5 Mol (705 g) phenol and 0.15 mol (30.3 g) dodecanethiol are introduced into a 1-liter round-bottomed flask equipped with a stirrer, dropping funnel, thermometer, reflux condenser and gas inlet pipe and saturated with dry HCl gas at 28° to 30° C. A mixture of 1.5 mol (210 g) dihydroisophorone and 1.5 mol (151 g) phenol is added dropwise to the resulting solution over a period of 3 hours at 28° to 30° C., HCl gas continuing to be passed through the reaction solution. After the addition, HCl gas is introduced for another 5 hours. The mixture is then left to react for 8 hours at room temperature in order to complete the reaction. The excess phenol is then removed by steam distillation. The residue is hot-extracted twice with 500 ml petroleum ether (60–90) and once with 500 ml methylene chloride and filtered off. Yield: 370 g, corresponding to 79%. Mp.: 205°–207° C.

2. Preparation of Polyether Ketones Used For Mixtures According to the Invention

Example 2a 31.04 g (0.1 mol) of the bisphenol corresponding to formula (A), 21.82 g 4,4'-difluorobenzophenone, 200 ml N-methyl pyrrolidone, 100 ml toluene and 18 g potassium carbonate are introduced into a nitrogen-purged stirred reactor provided with a water separator. The water is removed by azeotropic distillation until the mixture is free from water. The sump temperature is increased to 180° C. over a period of 1 hour by distilling off toluene. The mixture is stirred for 4 h at 180° C. and then heated for 1 h to 190°–195° C. It is then diluted with 200 ml N-methyl pyrrolidone and suction-filtered while still hot. The filtrate is neutralized with acetic acid and the polymer isolated therefrom by precipitation in a methanol/water mixture (1:1). For further purification, the polymer is dissolved in methylene chloride and then precipitated in methanol, followed by drying in vacuo for 14 h at 120° C. Yield: 37.6 g; relative viscosity, as measured in methylene chloride at 25° C. and at a polymer concentration of 5 g per liter: 1.297, glass temperature, as determined by the DSC method at a heating rate of 20 K/minute: 225° C.

With the aid of so-called thermomechanical analysis (TMA) the softening properties of the sample were determined at a heating rate of 1 K/min. by the penetrating action of a circular plunger (1 mm in diameter) and a higher than 235° C. did the plunger penetrate the sample to any significant degree.

EXAMPLE 2b:

15.52 g (0.05 mol) of the bisphenol of formula (A), 11.4 of bisphenol A (2,2-bis-(4-hydroxyphenyl)-propane; 0.05 mol), 21.82 g of 4,4'-difluorobenzophenone, 200 mol of N-methylpyrrolidone, 100 ml of toluene and 18 g of potassium carbonate are reacted together in a stirred apparatus as described in Example 2a) following the same procedure as that of Example 2a). After working up the mixture as in Example b 2a a polyether ketone with a relative solution viscosity of 1.463 (measured as in Example 2a) was isolated. The glass transition temperature-measured as described in Example 2a) - was 189° C. According to TMA analyssi carried out as described in Example 2a), significant penetration of the TMA plunger only occurred at temperature of higher than 195° C.

Example 2c

Following the same procedure as in Example 2a) 31.04 g of the bisphenol of formula (A), 21.82 g of 4,4'-difluorobenzophenone, 200 ml of N-methylcaprolactam, 100 ml of toluene and 18 g of potassium carbonate were reacted together. 38.4 of polyether ketone were isolated as described in Example 2a). The relative solution viscosity, determined as in Example 2a), was 1,383, the glass transition temperature, determined by the DSC method as in Example 2a), was 218° C. According to TMA analysis, as described in Example 2a), the plunger only penetrated the sample to any significant degree at temperature of higher than 230° C.

Example 2d

Following the same procedure as that of Example 2a), 403.52 g of bisphenol of the formula (A), 280.83 g of 4,4'-difluorobenzophenone, 2600 ml of N-methylpyrrolidone, 1300 ml of toluene and 234 g of potassium carbonate were reacted together. Then 6.57 g of 4-dichlorodiphenylsulfone were added as the chain terminator and the mixture was stirred for a further hour at 180° C. After working-up as in Example 2a), 411 g of polyether ketone were isolated. The relative solution viscosity, measured as in Example 2a), was 1.318, and the glass transition temperature, measured as in Example 2a), was 217° C. The point of penetration according to TMA analysis—as described in Example 2a)—was about 228° C.

3. Example

The following polymers (component b) were used for the following Examples:

3a) Poly-p-phenylene sulfide prepared in accordance with EP-PS 142,024, Example 2; melt viscosity 120 Pa.s, as measured at 306° C. and at a shear rate of 1000/sec.

3b) Polycarbonate of bisphenol A with a relative viscosity of 1.28, as measured in methylene chloride at 25° C. and at a concentration c of 0.5 g/dl polymer, and an Mw (weight-averaged molecular weight) of 28,500 g/mol. Glass temperature, as measured by DSC at a heating rate of 20 K/min.: approx. 146° C.

4. Preparation of the mixtures 4a) 20 g of the poly-p-phenylene sulfide 3a) were thoroughly mixed with 20 g of polyether ketone 2. at 315° C. in a small kneader. The quantity mixed was then pressed at 280° C. under a pressure of about 1 mm. The heat resistance may be characterized, for example, by the shear modulus as measured with a Brabender torsion pendulum under a tensile stress of 10 p and at a heating rate of 1 K/min. Table I below shows the distinctly higher modulus of the mixture according to the invention in relation to the comparison poly-p-phenylene sulfide.

4b) 20 g of polyether ketone 2. were dissolved with 1 g polycarbonate 3b) in 100 ml methylene chloride, the resulting solutions were mixed together and then thickened. A film was then prepared by spreading over a glass plate. The film had a thickness of 50 μm. The film was transparent and had a glass temperature of 211° C.

4c) 2 g of polyether ketone 2. were mixed as in 4b), but with 8 g polycarbonate 3b). The film produced had a thickness of 154 μm. The glass temperature of this film was measured by DSC. Result 167° C. Permeability to the gases oxygen and carbon dioxide was measured by comparison with a film of polycarbonate 3b) (thickness: 140 μm), the polycarbonate film also having been obtained for comparison from a thickened solution of methylene chloride. Both films, namely the comparison film of polycarbonate 3b) and the film according to the invention, were dried in vacuo for 2.5 hours at 100° C., after which permeability to certain gases was measured by pressure-measuring capacitors as detectors for a film having a cross-sectional area of approximately 4 cm². Table III compares permeability and heat resistance. It shows that the film according to the invention has improved heat resistance for at least the same permeability.

Example 4

Following the same procedure as in Example 4a), but using the polyether ketone of Example 2b) instead of the polyether ketone of Example 2a), a mixture was prepared at 335° C. from in each case 20 g of substance 3a) and 20 g of substance 2b) and was characterised in a torsion pendulum as shown in Table I.

Example 4e:

Following the same procedure as in Example 4a), but using the polyether ketone of Example 2c) instead of the polyether ketone of Example 2a), a mixture was prepared at 325° C. with a quantitative ratio of 20 g of substance 2c) and 10 g of substance 5a), and was characterised in a torsion pendulum as shown in Table 1.

Example 4f;

Following the same procedure as in Example 4a), 30 g of substance 2d) and 10 g of substance 3a) were intimately mixed and characterised in a torsion pendulum as shown in Table I,

TABLE I

| | Comparison of shear modulus | | |
|---|---|---|---|
| Substance | Shear modulus at T = 110° C. (all figures in MPa) | T = 140° C. | T = 200° C. |
| PPS 3a (Comparison) | 150 | 110 | 98 |

TABLE I-continued

| | Comparison of shear modulus | | |
|---|---|---|---|
| Substance | Shear modulus at T = 110° C. (all figures in MPa) | T = 140° C. | T = 200° C. |
| Example 4a, invention | 750 | 500 | 450 |
| Example 4d, invention | 640 | 480 | 120 |
| Example 4e, invention | 900 | 740 | 490 |
| Example 4f, invention | 910 | 750 | 510 |

TABLE II

| Comparison of glass temperature and transparency | | |
|---|---|---|
| Substance | Glass temperature | Appearance |
| Polycarbonate 3b (Comparison) | 146° C. | transparent |
| Example 4b, invention | 211° C. | transparent |

TABLE III

Comparison of permeability P (as measured in units $\frac{cm^3 \cdot mm}{m^2 \cdot 24h \cdot 10^5 Pa}$ for the gases oxygen and carbon dioxide; and glass temperature

| Substance | P(O₂) | P(CO₂) | Tg °C., DSC |
|---|---|---|---|
| Polycarbonate 3b (Comparison) | 72.0 | 366.0 | 146° C. |
| Example 4c), invention | 73.0 | 433.0 | 167° C. |

We claim:
1. A mixture comprising
(a) from 0.1 to 99.9 wt.%, based on the total amount of components (a) and (b), of an aromatic polyether ketone having a recurring structural unit of the formula

—O—E—O—E'— wherein
(1) —E$0 — is difunctional aromatic ketone group of the formula

in which Ar and Ar' are the same or different and represent difunctional aromatic radicals containing from 6 to 50 carbon atoms, and
(2) —O—E—O— is a difunctional diphenolate residue wherein from 0.1 mol-% to 100 mol-% of said diphenolate residues correspond to the formula

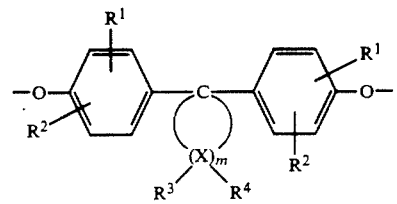

in which $R^1$ and $R^2$ independently represent hydrogen, halogen, $C_{1-8}$ alkyl, $C_{5-6}$ cycloalkyl, $C_{6-10}$ aryl, or $C_{7-12}$ aralkyl;

m is an integer of from 4 to 7;

$R^3$ and $R^4$ are selected individually for each X and independently represent hydrogen or $C_{1-6}$ alkyl; and X represents carbon;

with the proviso that, on at least one X, both $R^3$ and $R^4$ represent $C_{1-6}$ alkyl; and (b) from 0.1 to 99.9 wt.%, based on the total amount of components (a) and (b), of one or more other organic polymers selected from the group consisting of
(1) amorphous thermoplastics,
(2) partially crystalline thermoplastics, and
(3) elastomers having a glass transition temperature below 0° C.

2. A mixture according to claim 1 wherein (b)(1) is a polycarbonate, polyester, or polyester carbonate based on bisphenol A.

3. A mixture according to claim 1 wherein (b)(2) is a polycarbonate, polyester, or polyester carbonate based on bisphenol A.

4. A mixture according to claim 1 in the form of a film having a thickness of from 1 to 3000 μm.

* * * * *